United States Patent [19]
Breidenbach et al.

[11] Patent Number: 5,446,546
[45] Date of Patent: Aug. 29, 1995

[54] LASER INTERFEROMETRIC SINGLE PIECE FORCE TRANSDUCER

[75] Inventors: Thomas S. Breidenbach, Renton; Michael E. Mould, Kent; Charles R. Pond, Des Moines, all of Wash.

[73] Assignee: The Boeing Company, Seattle, Wash.

[21] Appl. No.: 86,795

[22] Filed: Jul. 2, 1993

[51] Int. Cl.[6] ............................................. G01B 9/02
[52] U.S. Cl. .................................... 356/358; 356/345
[58] Field of Search ............... 356/355, 356, 357, 358, 356/345; 73/772, 788, 800, 802

[56] References Cited

U.S. PATENT DOCUMENTS

| | | | |
|---|---|---|---|
| 3,092,914 | 6/1963 | Buscher | 33/169 |
| 3,438,251 | 4/1969 | Kloss | 73/141 |
| 3,790,284 | 2/1974 | Baldwin | 356/106 |
| 3,815,996 | 6/1974 | Colding et al. | 356/106 |
| 3,903,734 | 9/1975 | Douglas | 73/99 |
| 3,926,523 | 12/1975 | Chapman | 256/110 |
| 4,261,107 | 4/1981 | Coleman et al. | 33/174 L |
| 4,286,879 | 9/1981 | Jager et al. | |
| 4,798,461 | 1/1989 | Pavlin et al. | 356/138 |
| 4,962,669 | 10/1990 | Gernhart et al. | 73/800 |
| 5,012,679 | 5/1991 | Haefner | 73/800 |

FOREIGN PATENT DOCUMENTS

| | | |
|---|---|---|
| 1487837 | 7/1967 | France . |
| 138704 | 11/1979 | Germany . |
| 143956 | 9/1980 | Germany . |

OTHER PUBLICATIONS

Interfganzoptische Kraftsensoren–Eine Neue Konzeption For Die Kraftmess–Und Wagetechnik, Jager, Technisches Messen, Sep. 1985.

*Primary Examiner*—Samuel A. Turner
*Attorney, Agent, or Firm*—Conrad O. Gardner

[57] ABSTRACT

A highly accurate force transducer with flanges and flexures to produce uniaxial flexibility and which utilizes a laser with retroreflectors and an interferometer detecting force movements with resolution of a fraction of a wavelength of light, typically 0.0000003 inch. A mechanical amplifier increases resolution, accuracy, and repeatability. Any deviation from uniaxial movement of the flanges/mirrors detected by three other retroreflector/interferometer systems may be stored in a computer and utilized to correct the force measurements.

2 Claims, 6 Drawing Sheets

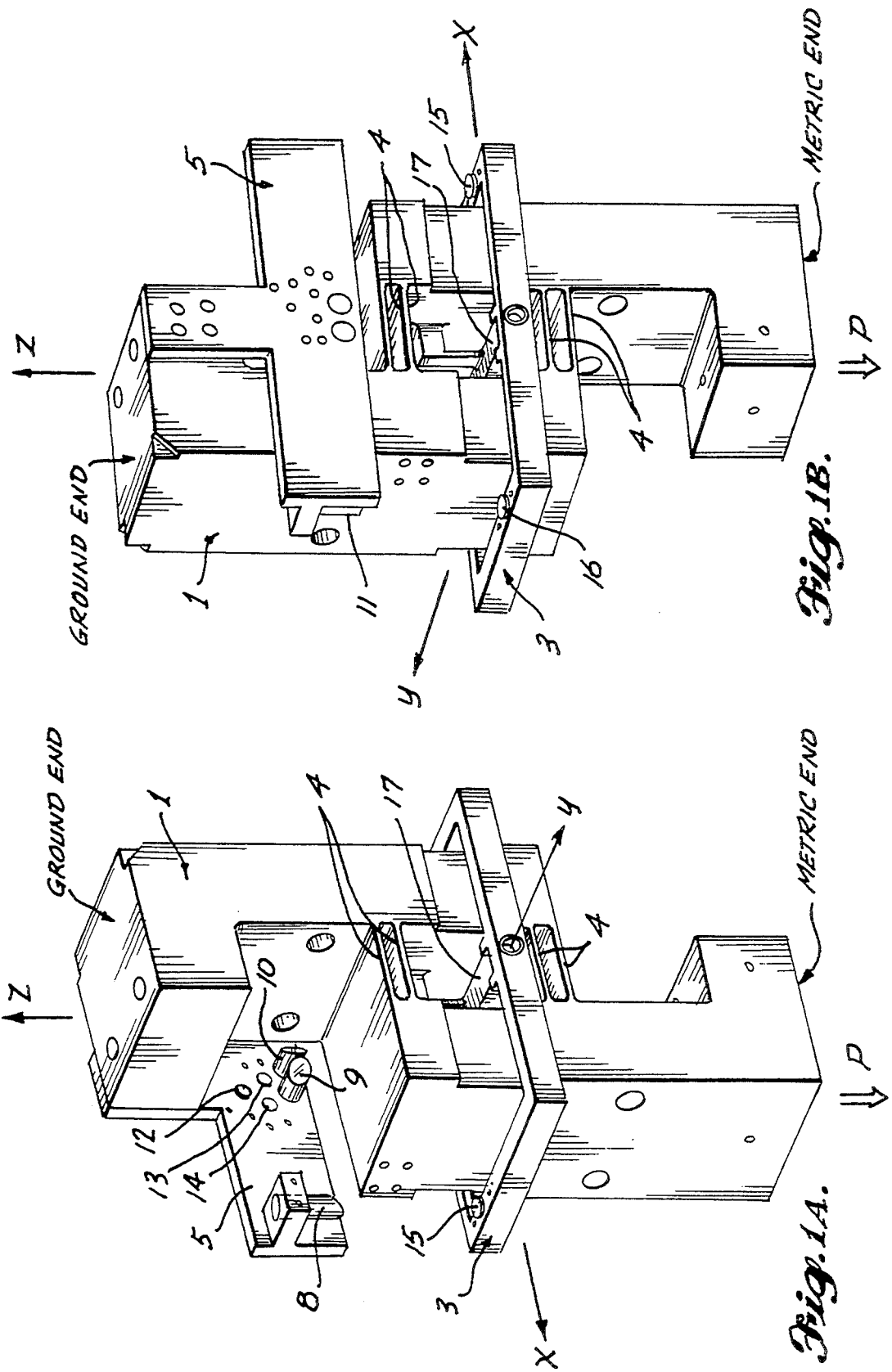

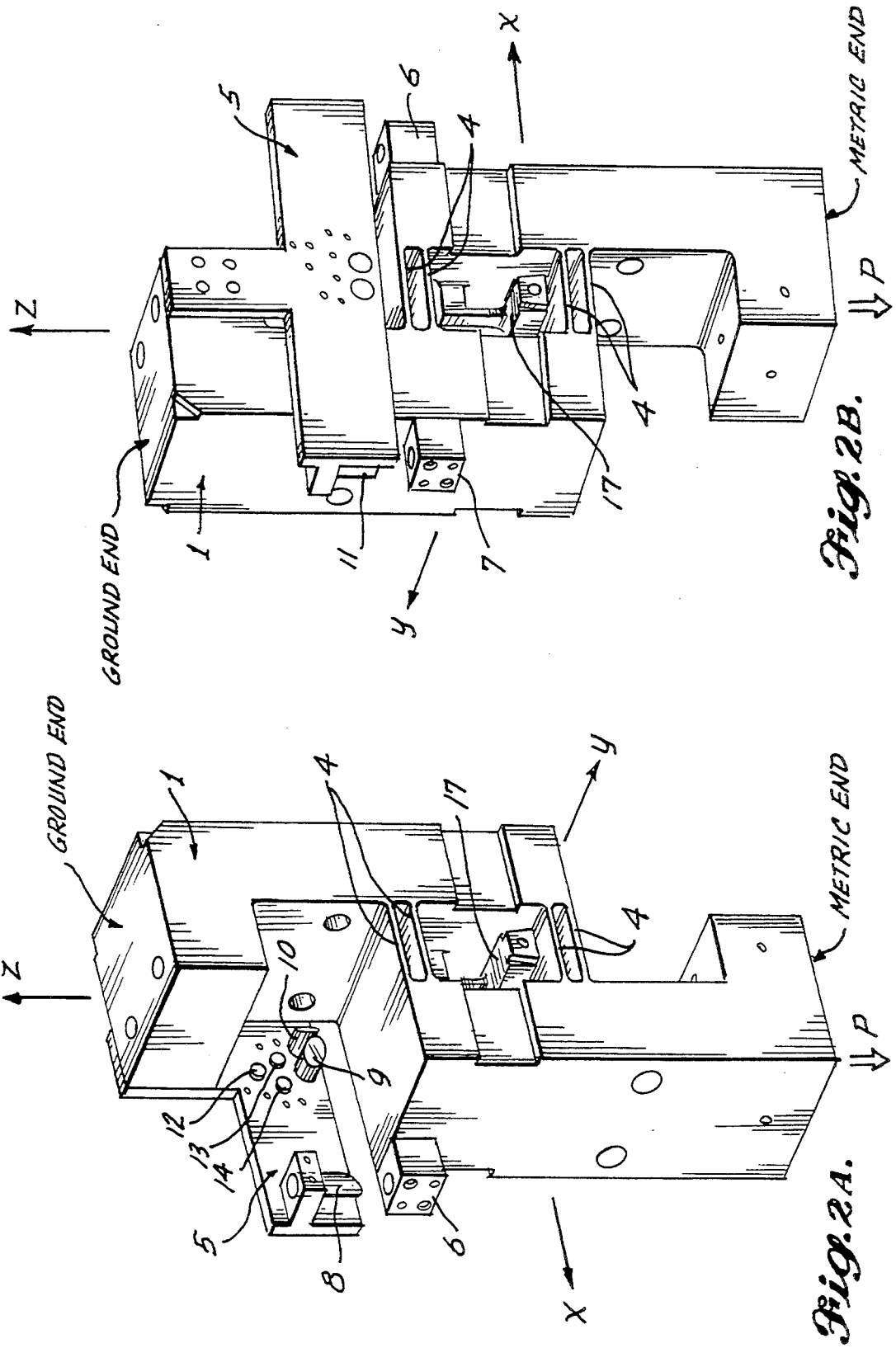

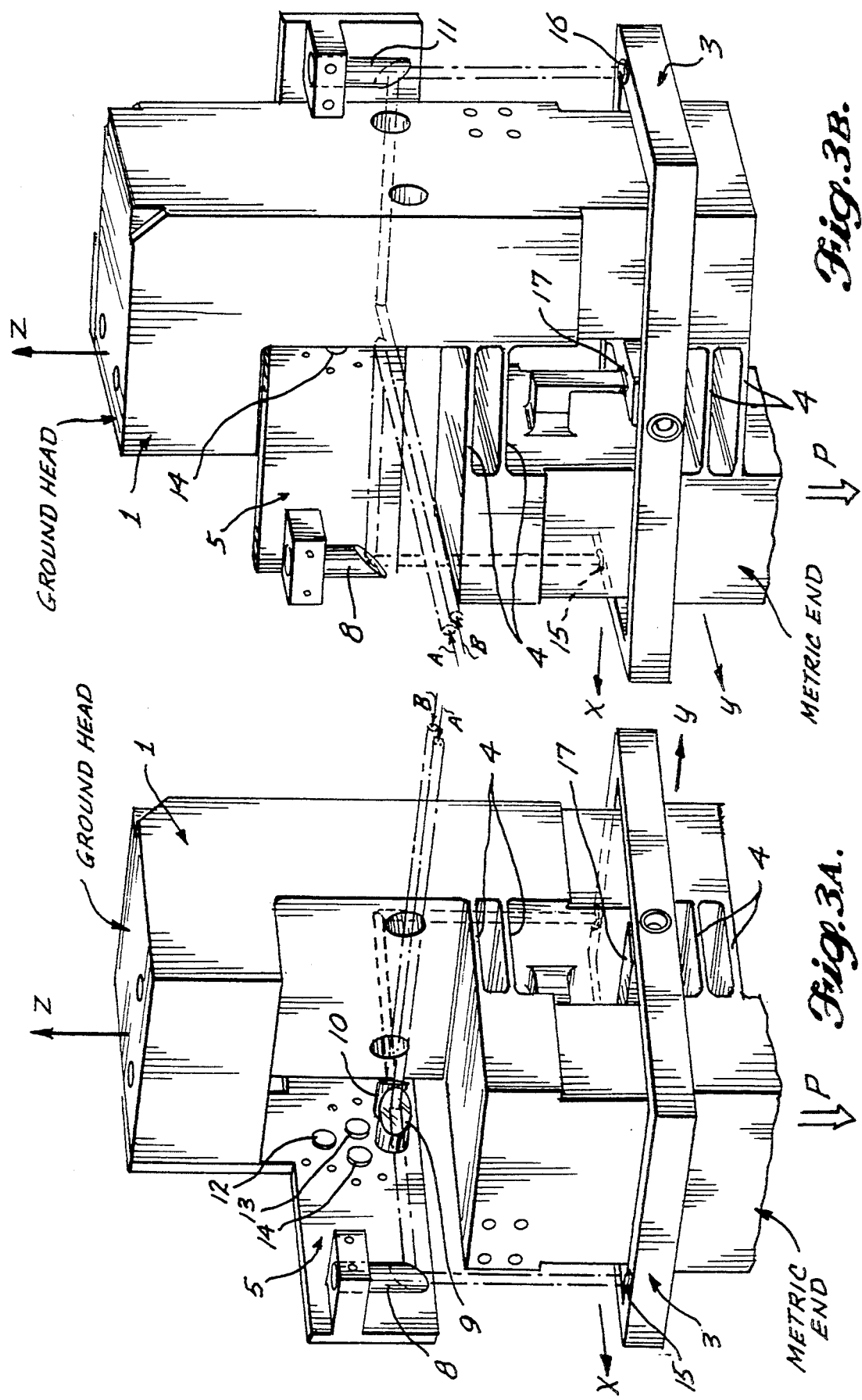

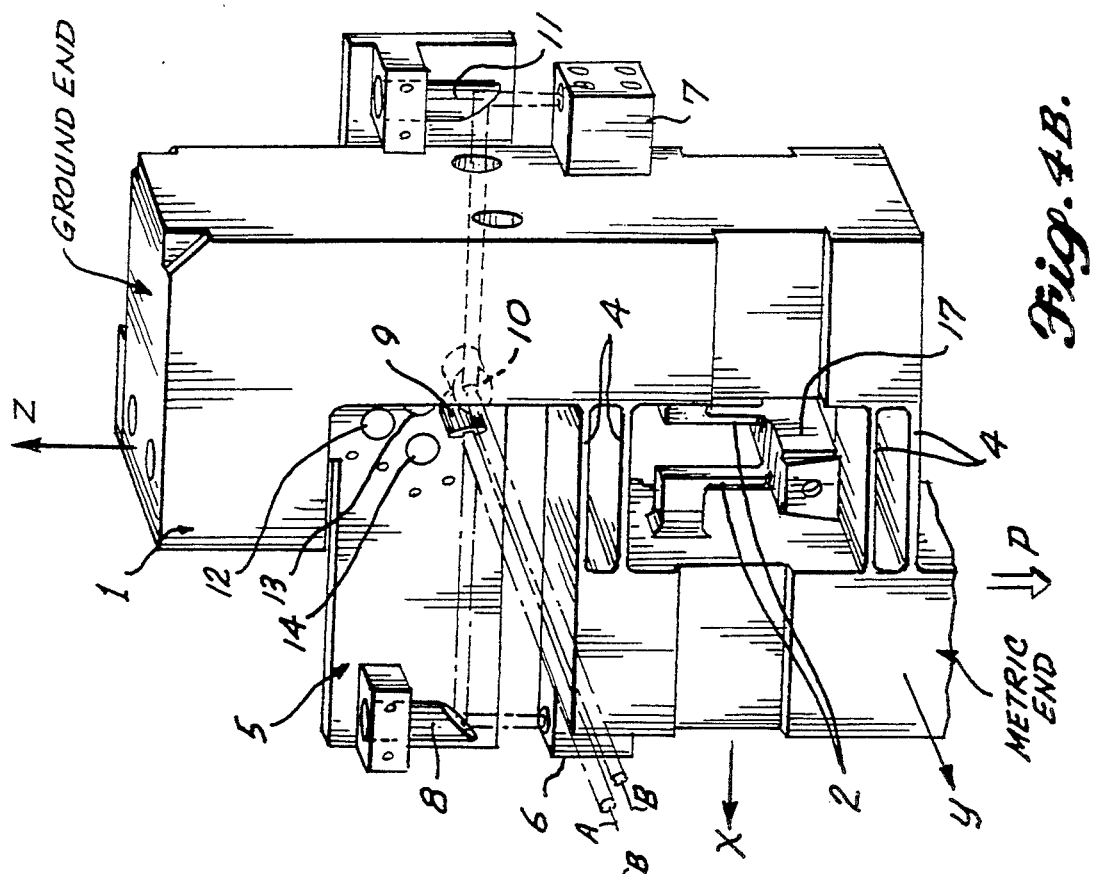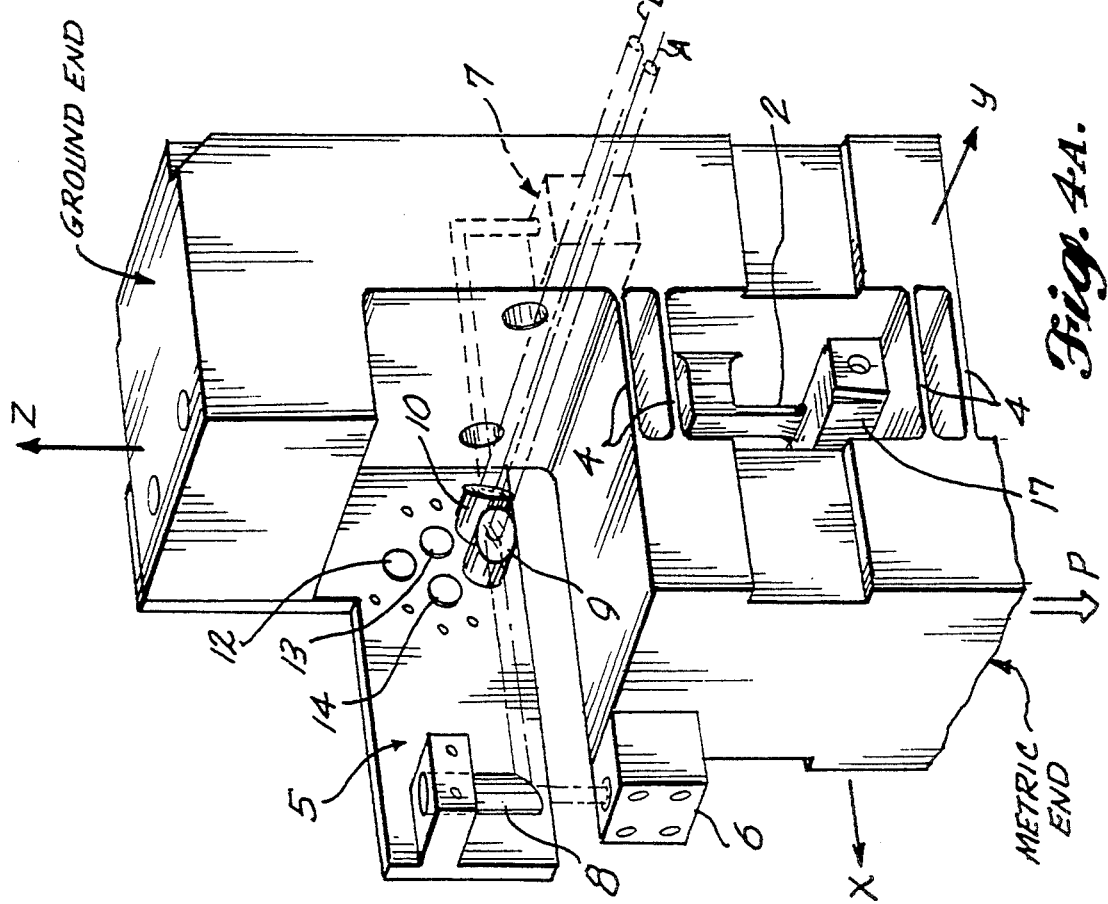

LASER INTERFEROMETRIC SINGLE PIECE FORCE TRANSDUCER

FIELD OF THE INVENTION

This invention relates to a method and apparatus for measuring forces using laser interferometric principles.

BACKGROUND OF THE INVENTION

The measurement of large loads, both forces and moments, with little uncertainty is desired in many applications. One such instance is in the measurement of the loads encountered by a scale model in wind tunnel testing, where errors and uncertainties are magnified by making full scale correlations. Typically, the instruments used for measuring these loads, known as balances, are of the following two general types; strain gaged and/or weigh beam. Of the first type, there are two common variations, those using flexural elements, and those using load cells. Regardless of which variation or combination is used, the accuracy, repeatability, and resolution are all limited by the use of strain gages and the associated output voltage reading accuracy. Intrinsic to the strain gage transducer is a need to design for stress levels which yield adequate strain at the location of strain gage installation. These stress levels often result in fatigue of the flexural elements and require frequent calibrations to ensure that the strain gages themselves are indeed securely bonded. Weigh beam balances utilize a series of fulcrums and levers to reduce the applied loads to magnitudes which can be handled by electro-mechanical force restoring coils and/or precision load cells. While stress levels can be appreciably reduced from those of a strain gage balance, weigh beam balances are generally more flexible. This flexibility results in the translation and rotation of the balance calibration center, and with that, another uncertainty is introduced. Additionally, weigh beam balances require larger volumes to accommodate the load reducing levers.

Prior art patent literature includes German Patent (patentscrift) No. 138,704 showing a scale utilizing a laser interferometry instrument for the measurement of applied weights utilizing a clamped wire for measuring forces in the downward direction.

In contrast, the present instrument is a precision, multi-piece, unidirectional scale capable of measuring both tensile and compressive (bi-directional) loads without regard to gravitational direction.

In further contrast, the present instrument has a single piece load path thereby eliminating hysteresis on a macro level and confining it to the hysteresis experienced on a molecular level, a quantity much smaller than experienced in multi-piece construction instruments.

In yet further contrast with German Patent (patentschrift) No. 138,704, linkages in which alignment is critical are not utilized; rather, deflection is confined to a specific region as that of a beam in bending, and an amplification arm is used to magnify small deflections and to isolate the measurement to the center of bending, a characteristic yielding improved system accuracy.

Further patent literature includes German Patent (patentschrift) No. 143,956 of the interferometric type utilizing a Z-shaped, double flexure element in FIG. 12E; however, not utilizing an amplification arm for magnifying small deflections.

SUMMARY OF THE INVENTION

The linear transformation of two points on an elastic material is measured for incrementally applied precision loads using a split beam laser interferometer. Another interferometric measurement is made of the rotational and transitional movement of the loaded system relative to the laser source owing to loading deformation; in this manner, corrections to apparent measurements are made to determine the true deflection caused by an applied load. The determination of a deflection to applied load relationship using a laser interferometer results in a force and moment measuring transducer with a high degree of accuracy, repeatability, and resolution.

The additional use of a mechanical displacement amplification lever allows for an even stiffer instrument with the added benefit of better accuracy, repeatability, and resolution.

BRIEF DESCRIPTION OF THE DRAWINGS

FIGS. 1A and 1B are isometric front and rear views of an embodiment of the present system with the displacement amplification lever installed;

FIGS. 2A and 2B are isometric views of the present system in use without the displacement amplification lever;

FIGS. 3A and 3B depict the laser beam path when the displacement amplification lever is used;

FIGS. 4A and 4B demonstrate beam paths without the amplification lever;

DESCRIPTION OF PREFERRED EMBODIMENTS AND OF THE BEST MODE OF THE INVENTION

General Description

Figure 5:
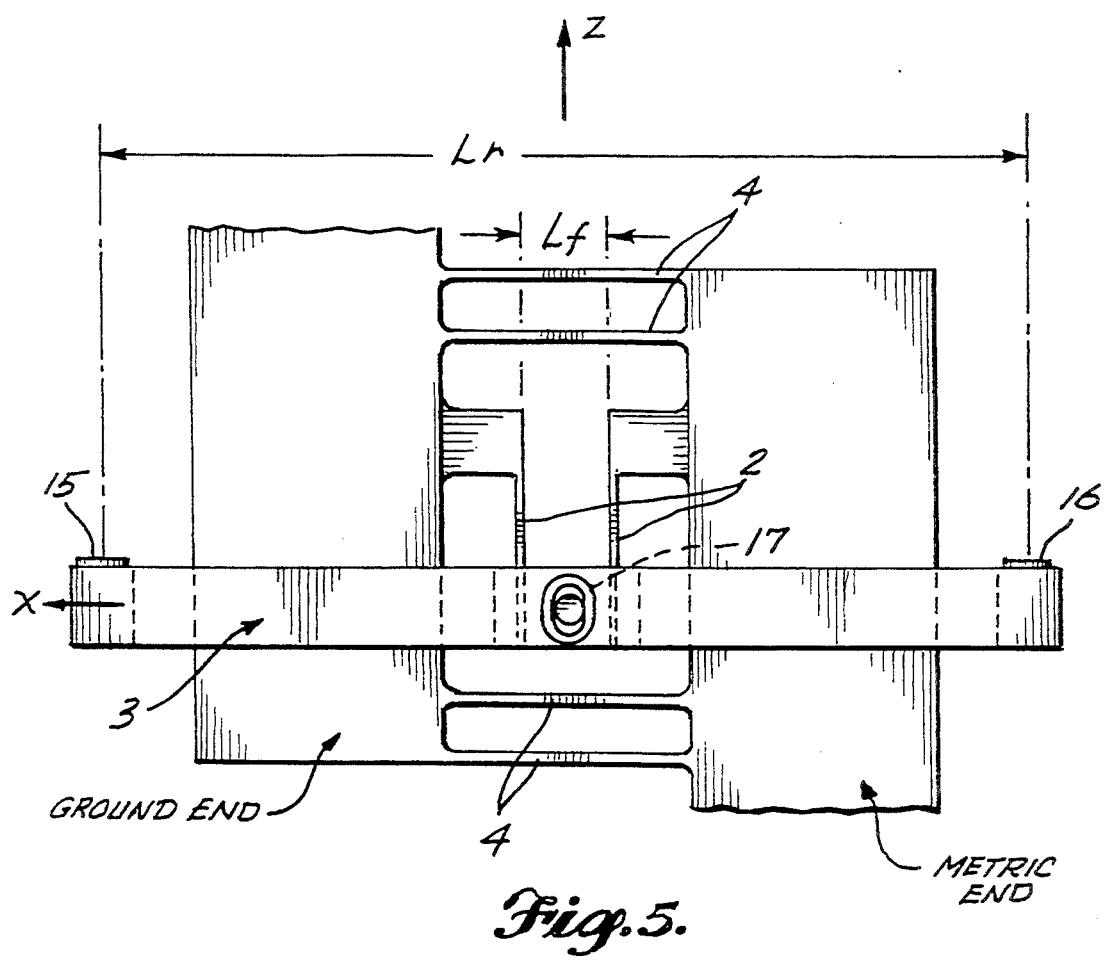
FIG. 5 is included to show the operational principle of the displacement amplification lever.

The present system comprises four primary components: the force transducer 1, laser beam manipulators, amplification flexure 2, and a displacement amplification lever 3. The force transducer has a ground end which is rigidly attached to a fixed reference plane, and a metric, or "live," end to which loads are applied. The ground and metric ends of the transducer are separated by four primary flexural elements, which will be referred to as the primary flexures 4. These primary flexures are stiffest and most resistant to loads applied off of the design loading direction and more flexible and less resistant to deflections from loads applied in the design direction. In the Figures, this corresponds to the primary flexures 4 being very stiff and resistant to deformation owing to; forces applied in the x and y directions, and moments applied about any of the axis, while being relatively flexible to loads applied in the z direction. Thus, for an applied load, P, there will be a relative displacement between the ground and metric ends of the transducer. It is a design objective to size the primary flexures such that the stress levels are low, which ensures elastic behavior, and to obtain enough deflection with an applied load to adequately define the relationship between deflection and load. While the requirement for adequate deflection and a stiff transducer are contradictory, the laser interferometer allows minimization in the present system to what is necessary for "adequate" deflection while allowing still a stiff transducer. The interferometer used to prove the present concept allowed design for a full scale deflection of 0.700 inches with a load of 300 pounds, resulting in a resolution of 0.013 pounds. This resolution could be refined by using a more advanced interferometer-interference fringe counting system, and/or using the displacement amplification lever 3.

In FIGS. 2A, 2B, 4A, and 4B the basic system is operated without the displacement amplification lever. The force transducer 1 is machined from a single piece of material (to minimize hysteresis induced by joint slippage) and is composed of the ground end, the metric end, primary flexures 4, and amplification flexures 2. To the force transducer, there is attached a mirror bracket 5, and retroreflectors 6 and 7. On the mirror bracket, there are beam turning mirrors 8, 9, 10, and 11, along with spatial displacement monitoring retroreflectors 12, 13, and 14. It can be seen in FIGS. 4A and 4B that light beam path A, traveling in the -y direction, strikes mirror 9, is turned 90° to the -x direction striking mirror 8 which turns the beam 90° to the -z direction, and finally strikes retroreflector 6, which is attached to the metric end of the force transducer 1. Retroreflector 6 turns beam A 180° and returns it through the same mirrors (in reverse order) to the source. Likewise, beam B travels a similar path through mirrors 10, 11 to retroreflector 7 where it too is sent back to the source. Initially, both light paths A and B are of the same nominal length. As a tension load P is applied, it can be seen that light path A becomes longer while light path B remains virtually unchanged in length. In this manner, interference fringes are experienced and counted at the fringe counter, allowing establishment of a relationship between load and interference fringes, which are proportional to the relative displacement in the z direction of the two retroreflectors 6 and 7, while being relatively immune to asymmetric displacement anomalies. In this case, a total relative displacement of $\Delta z$ between retroreflectors 6 and 7 is experienced under an applied load P. Thus, the resolution becomes a function of the relative displacement $\Delta z$, applied load P, and that displacement which corresponds to a single fringe count, in this case, 3E-07 inches, i.e., $$\text{Resolution} = \frac{(P)(3E\text{-}07 \text{ in})}{\Delta z}$$

$$\text{Resolution} = \frac{(300 \text{ pounds})(3E\text{-}07 \text{ in})}{(7E\text{-}07 \text{ in})}$$

which gives a resolution of 0.013 pounds. From the above relationship, it is apparent that if it is desired to resolve the loads in smaller quantities for a given load range P, either a better interference fringe counter can be obtained which actually counts and/or breaks up individual fringes into fractional fringes, increase the relative displacement $\Delta z$, or magnify the displacement $\Delta z$ as is done with the displacement amplification lever 3.

Referencing FIGS. 1A and 1B, retroreflectors 6 and 7 have been replaced with retroreflectors 15 and 16 which are mounted directly on the displacement amplification lever 3. In FIG. 5, it can be seen that the displacement amplification lever 3 is attached to both the ground and metric ends of the force transducer 1 through the displacement amplification flexures 2 which are separated from one another by a distance Lf. If the metric end is deflected downward by a distance $\Delta z$, it can be seen that retroreflector 15 is deflected downward and retroreflector 16 is deflected upward. In fact, the displacement amplification lever is experiencing a rotation of $\theta$ degrees in the x-z plane, and a translation of $\Delta z/2$ in the -z direction. Thus, the only relative displacement between retroreflectors 15 and 16 which is of interest to us is that which is owing to the rotation of the displacement amplification lever 3, which is given by:

$$\Delta z' = \Delta z (Lf/Lr) \cos(\theta)$$

For small displacements of $\Delta z$, $\theta$ is small (approximately 0.5°, thus $\cos \theta \sim 1$) and $\Delta z'$ can be approximated as:

$$\Delta z' = \Delta z (Lf/Lr)$$

In this case, the ratio of Lf/Lr was 10, thus giving an order of magnitude increase in resolution, or the ability to resolve 0.0013 pound on a system capable of 300 pounds full scale. This corresponds to a resolution of 0.0004% of full scale. Referencing FIGS. 3A and 3B, it can be seen that the optical paths A and B are not really changed from the configurations which do not use the displacement amplification lever; conversely, retroreflectors 15 and 16 both experience motion, resulting in the optical path length of beam A getting longer while path B gets shorter.

It was further found that the addition of the displacement amplification lever yielded similar improvement in accuracy as it resulted in a $2\sigma$ envelope of non-repeatability of:

$2\sigma = 0.0285$ pound or $2\sigma = 0.0095\%$ of full scale.

Figure 6:
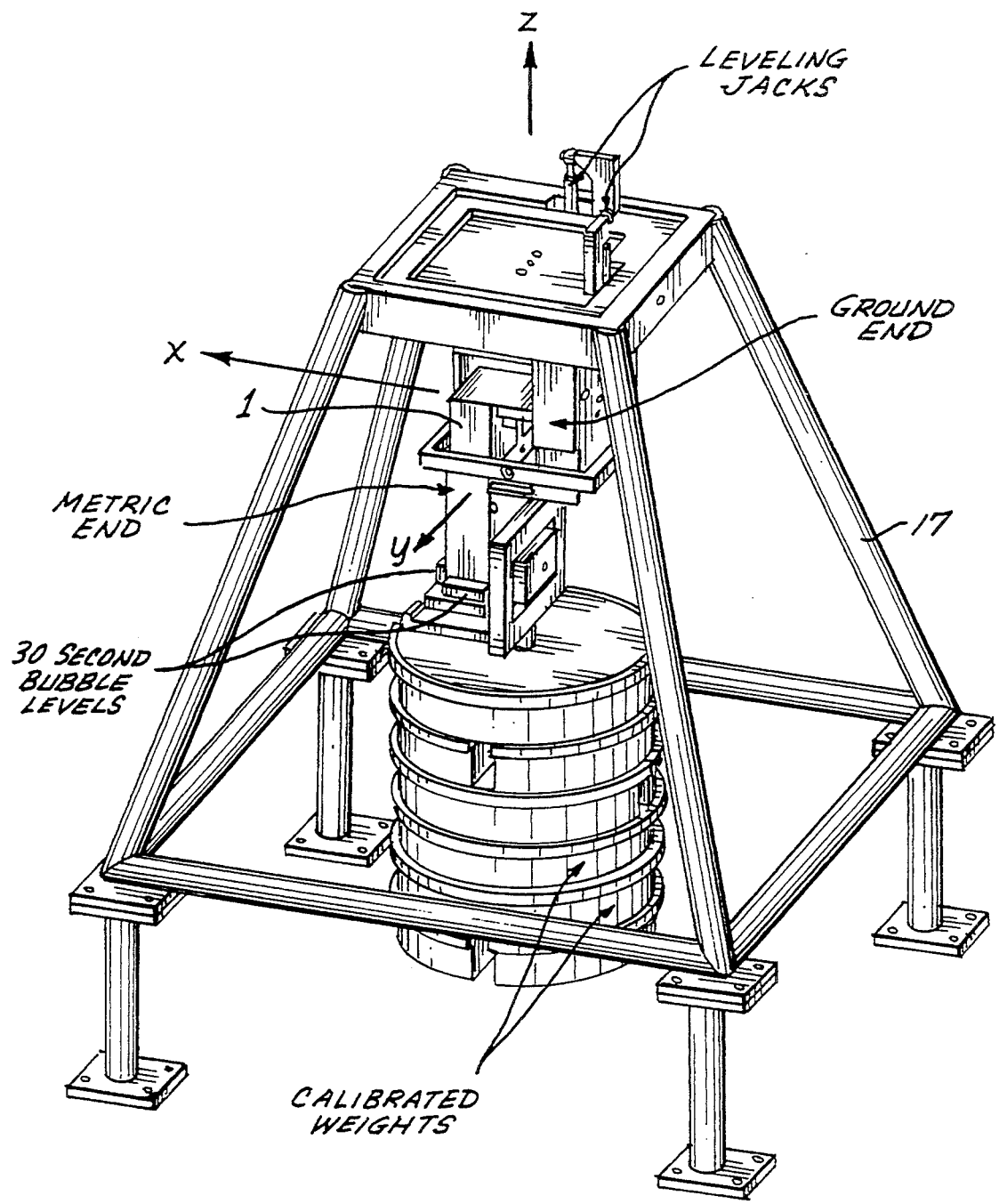
FIG. 6 to show how a typical prototype test was set up.

Retroreflectors 12, 13, and 14 were used throughout all testing phases to monitor and correct for relative spatial orientation changes between the interferometer and the force transducer. Translations along the y axis which resulted in longer or shorter optical paths had no adverse effect on the data as both paths A and B changed by the same amount and in the same direction. However, as the system was loaded, any rotation of the test stand 17, reference FIG. 6, (in this Figure the force transducer is configured for tension load applications) about the z axis (racking), or about the y axis (leaning), would erroneously indicate deflections owing to loads which are not present, because the optical path lengths, A and B, would differentially change. By using retroreflectors 12, 13, and 14 to describe and monitor the x-z plane, there is ability to correct for these anomalies. Additionally, the force transducer and laser beam manipulating array of mirrors and retroreflectors were designed such that symmetry was maintained, thus also minimizing the effects which could otherwise have been caused by differential temperature growth.

DETAILED DESCRIPTION

The prototype force transducer can be used in two different configurations as shown in FIGS. 1 and 2. In each configuration, a force measurement is possible because of the relative movement between the metric and ground ends. This movement occurs through the flexures 4 in the axial direction and the flexures have very little movement in the other directions, even if lateral forces are present. The movement in the prototype was about ±0.010" in the axial direction. To measure the very small distances involved, a laser interferometer was used.

Consider the configuration in FIG. 2. Twin laser beams come in from a distance and reflect off of 45° mirrors 9 and 10. The beams then hit another pair of 45° mirrors 8 and 11, (mirrors 8, 9, 10 and 11 are held to the ground end by bracket 5) this sends them to a pair of retroreflectors 6 and 7. The light then traces the same path back where it is picked up by an interferometer. The interferometer detects the change in the number of wavelengths which fit in the light path. As the light path grows or shrinks, a computer may be used to record the change by counting the number of wavelengths which pass. Atmospheric disturbance of the light is compensated for by the twin beams, since the beams lie close together they should experience close to the same changes caused by any atmospheric disturbances. The measurement of the relative movement between the ground and metric ends is computed from the difference in the apparent path change in the two beams. If the atmosphere causes any change in the apparent path length, it will affect both beams and the difference between the two will be zero. The interferometers we used were capable of measurements with a resolution of 0.0000003 in., which theoretically would give ±33,333 counts of resolution in the ±0.010 in. deflection of our prototype. The flexures could be designed for a much larger deflection which would give a corresponding increase in resolution.

The difference in the configuration in FIG. 1 is the addition of a mechanical amplifier to which the retroreflectors 15 and 16 are mounted. The amplifier consists of a lever 3 which is connected to a rectangular shaft 17 by two tapered joints and two bolts. The rectangular shaft 17 is also one piece with the flexures 4. One flexure is one piece with the ground end while the other is one piece with the metric end. The measured deflection at the retroreflectors 15 and 16 is increased by the ratio Lr:Lf over the deflection between the ground and metric ends (see FIG. 5). The advantage of using the mechanical amplifier is an increased difference in path lengths of the twin laser beams without an increase in deflection between the ground and metric ends, yielding an increase in resolution, accuracy, and repeatability over the configuration without the mechanical amplifier. The only disadvantage known for the mechanical amplifier is an increased sensitivity to dynamic loading. Depending on the loading conditions measured, the accuracy of the interferometer used, and the requirements for the measurement, a mechanical amplifier may or may not be necessary.

A key feature of the prototype is its one-piece construction. This prevents any slippage across a joint which would introduce error into the measurement. Pieces which do not carry a load other than their own weight are secured with bolts and press fit pins to prevent any relative movement across the joint. The lever 3 is secured to the rectangular shaft 17 by two tapered joints (which lock to each other) and two bolts. The retroreflectors 15 and 16 are held in their sockets by spring clips (not shown). The mirrors 8, 9, 10 and 11 are held in their holes by two set screws each.

A second key feature of the prototype is the arrangement of the ground and metric ends with the flexures 4. This geometry produces a structure which is very stiff in every direction except the z direction. This makes the prototype very insensitive to forces and moments except a force in the z direction. The stiffness in the z direction can be controlled by choosing an appropriate geometry and number of flexures. The designer can control the stiffness, maximum deflection under maximum load, and stress level for a given application. By designing to a given stress level, problems which plague strain gage force transducers can be avoided. Stresses can be reduced to levels below those which would cause fatigue, creep, or anelasticity problems. A less expensive or alternate material with special properties could be used by controlling the stress level to suit that material.

The retroreflectors 12, 13, and 14 mounted on the bracket 5 are used by three laser beams which also go to independent interferometers. Any movement of the retroreflectors is detected by the interferometers and may be stored in computer memory. This information is used to detect any movement in the ground end and also to compensate for any slight disturbance of the mirrors and other optical equipment which routes the laser beams. The computer can compensate for these effects by a "rigid body" program. The program computes the constants it needs when a mirror is purposely disturbed during set up. The effect of using the "rigid body" program is less sensitivity to movement in the optical and structural support equipment.

An advantage in using interferometers is their digital output which can be processed by noise-free digital computers. An advantage in laser light over strain gages is their unrestricted temperature range limited only by the retroreflector material. Since there is little stress induced to the retroreflector, there is no fatigue or bonding problems.

It will occur to those skilled in the art from the preceding that there are other ways to utilize the present measuring system concepts; e.g., pressure or torque transducers, inertial guidance systems, and for measuring several forces and moments at once. In wind tunnels the three forces and three moments which act on the model must be determined. By arranging a number of single component force transducers, it is possible to measure the three components of force and three components of moment on a wind tunnel model or in other systems.

What is claimed is:

1. A laser interferometric force transducer having a single piece load path for eliminating hysterisis on a macro level comprising in combination:

a force transducer machined from a single piece of material thereby minimizing hysterisis induced by joint slippage;

said force transducer having a ground end, metric end, primary flexures, amplification flexures, and a rectangular shaft;

said ground end being attached to said metric end by each of the said primary flexures and by said amplification flexure, said rectangular shaft, and another of said amplification flexure in series;

a mirror bracket;

said mirror bracket attached to said ground end of said force transducer;

a plurality of spatial displacement monitoring retroreflectors;

said plurality of spatial displacement monitoring retroreflectors attached to said mirror bracket;

a plurality of beam turning mirrors;

said plurality of beam turning mirrors attached to said mirror bracket;

a metric retroreflector;

said metric retroreflector mounted on the ground end of said force transducer;
another metric retroreflector;
said metric retroreflector mounted on the metric end of said force transducer;
a plurality of laser interferometers;
two beams of the said plurality of laser interferometers positioned to reflect off of said plurality of beam turning mirrors and said plurality of metric retroreflectors in such manner that any axial force applied across the said metric end and said ground end causes a change in the beam lengths by causing a transverse deflection across the said primary flexures; and,
three beams of the said plurality of interferometers positioned to reflect off of said spatial displacement monitoring retroreflectors.

2. A laser interferometric force transducer having a single piece load path for eliminating hysterisis on a macro level comprising in combination:
a force transducer machined from a single piece of material thereby minimizing hysteresis induced by joint slippage;
said force transducer having a ground end, metric end, primary flexures, amplification flexures, and a rectangular shaft;
said ground end being attached to said metric end by each of said primary flexures and by said amplification flexure, said rectangular shaft, and another of said amplification flexure in series;
a mirror bracket;
said mirror bracket attached to said ground end of the said force transducer;
a plurality of spatial displacement monitoring retroreflectors;
said plurality of spatial displacement monitoring retroreflectors attached to said mirror bracket;
a plurality of beam turning mirrors;
said plurality of beam turning mirrors attached to said mirror bracket;
a plurality of metric retroreflectors;
a displacement amplification lever;
said plurality of metric retroreflectors mounted on said displacement amplification lever;
said displacement amplification lever mounted on said rectangular shaft;
a plurality of laser interferometers;
two beams of the said plurality of laser interferometers positioned to reflect off of said plurality of beam turning mirrors and said plurality of metric retroreflectors in such a manner that any axial force applied across the said metric end and said ground end causes a change in the beam lengths by causing a transverse deflection across the said primary flexures and subsequent rotation of the rectangular shaft and the displacement amplification lever and;
three beams of the said plurality of interferometers positioned to reflect off of said spatial displacement monitoring retroreflectors.

* * * * *

UNITED STATES PATENT AND TRADEMARK OFFICE
CERTIFICATE OF CORRECTION

PATENT NO. : 5,446,546
DATED : August 29, 1995
INVENTOR(S) : Breidenbach, et. al.

It is certified that error appears in the above-indentified patent and that said Letters Patent is hereby corrected as shown below:

Column 3, Line 3, "0.700 inches with"
      should read —0.007 inches with—

Signed and Sealed this

Twelfth Day of December, 1995

Attest:

BRUCE LEHMAN

Attesting Officer     Commissioner of Patents and Trademarks